April 21, 1964          J. R. MARTIN          3,129,588
INDICATING DEVICE
Filed Sept. 7, 1961
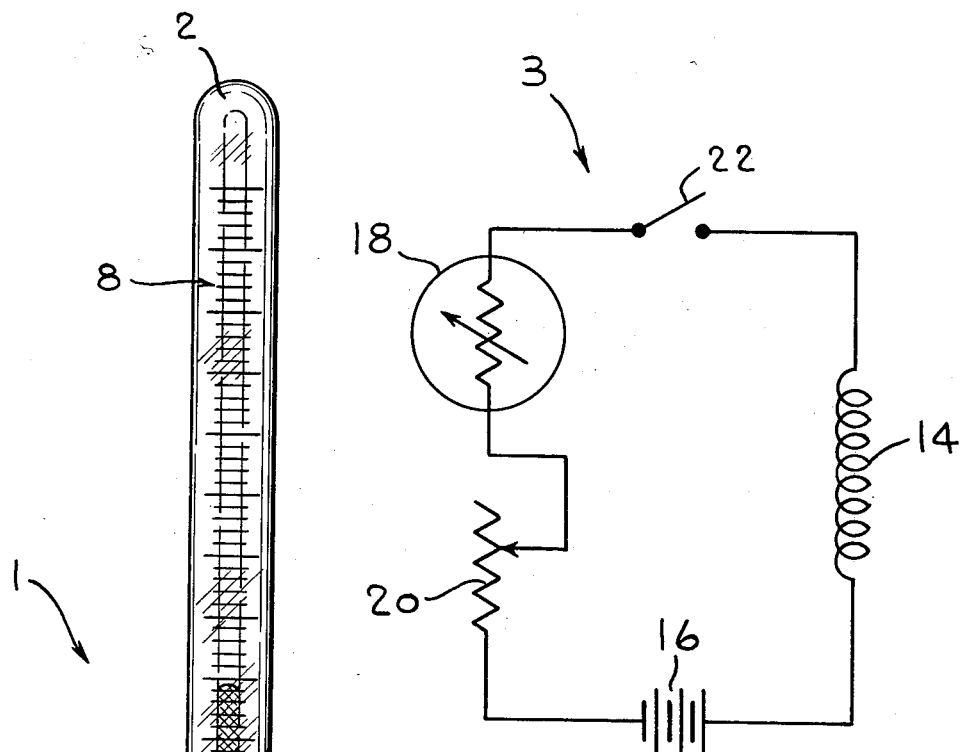
FIG. 2
FIG. 1
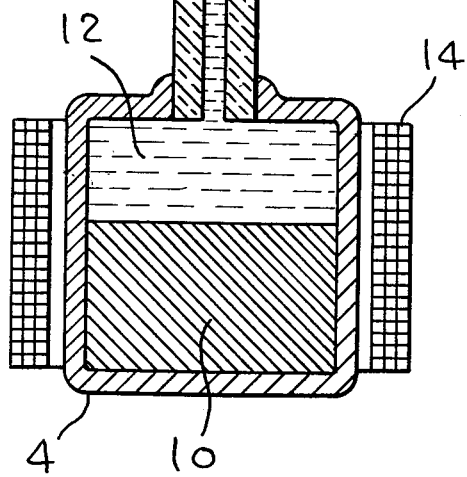
INVENTOR.
JOHN R. MARTIN
BY
*Bayard H. Michael*
ATTORNEY 3,129,588
INDICATING DEVICE
John R. Martin, 1027 E. Hampton Ave., Milwaukee, Wis.
Filed Sept. 7, 1961, Ser. No. 136,614
7 Claims. (Cl. 73—362)

This invention relates to indicating devices and, more particularly to temperature indicating devices.

An object of this invention is the provision of a new, improved and simplified indicating device.

Another object of this invention is the provision of an accurate and highly versatile indicating device.

A further object of this invention is the provision of an accurate and instantaneously reading temperature indicating device.

For the accomplishment of these objects this invention contemplates utilizing the magnetostrictive properties of magnetic materials to control the read-out of an indicating device; and, in its more limited sense, temperature responsive means is provided to control the degree of magnetization of such materials so that the read-out is dependent upon and is a measure of temperature.

The novel features of this invention are set forth in the appended claims. The invention itself, together with additional objects and advantages thereof will be more clearly understood from a reading of the following description in connection with the accompanying drawings wherein:

FIG. 1 is a cross sectional view of the read-out portion of a preferred embodiment of this invention; and FIG. 2 is a diagrammatic representation of the electrical circuit of a preferred embodiment of this invention.

This invention is illustrated as preferably embodied in a temperature indicating device, however, as will be discussed more fully hereinafter, it has wider application and is not intended to be limited to a temperature indicating device. The temperature indicating device includes a temperature reading portion 1 and an electric circuit portion 3, illustrated in FIGS. 1 and 2 respectively. The temperature reading portion 1 includes an outer housing 2 including a body portion 4 and a read-out portion 6 of reduced cross section sealingly connected to the body portion. The read-out portion can be of glass with suitable spaced apart graduations 8 provided thereon, in this instance temperature graduations. The body portion can be of a suitable metallic material, such as Covar.

A metallic material 10 capable of being magnetized, such as nickel, is contained within the body 4. A liquid medium 12 fills the remainder of the body 4 and extends into the read-out portion 6. Since the material 10 and liquid 12 are contained within a sealed enclosure, the extension of the liquid into the read-out portion 6 is determined by the volume of the material 10. As will be discussed more specifically hereinafter, the temperature indicating device of this invention includes means for magnetizing the material 10. Due to magnetostriction, the volume of the material 10 changes as it is magnetized, with the amount of change being related to and varying with the degree of magnetization of that material. The magnetostrictive expansion or contraction of the material 10 has an immediate and direct effect on the liquid 12 to thereby vary its position within the read-out portion 6.

The circuit 3 includes an electric coil 14 supplied by a suitable battery 16, e.g. a small mercury battery such as is used in a hearing aid. Connected in circuit with the battery 16 and the coil 14 is a temperature sensitive control device such as a thermistor 18. The resistance of the thermistor 18 varies with its temperature, so that the thermistor can be exposed to various temperatures and will control the amount of the current flowing in the coil 14 in accordance with those temperatures. The electrical components are preferably connected in series circuit relationship, but alternate circuits can be used without departing from the scope of this invention.

As current flows through the coil 14 a field is generated around the coil. The material 10 is positioned within this field so that it will become magnetized. The degree of magnetization of this material 10 is dependent upon the strength of the field of the coil 14 which is in turn dependent upon the amount of current flowing through the coil. The current flowing in the coil is controlled by the temperature sensitive thermistor 18 and varies according to the temperature thereof. Therefore, the thermistor can be exposed to a particular unknown temperature and will practically instantaneously vary the amount of current flowing in the coil in accordance with that temperature to produce a corresponding change in the position of the liquid 12 and produce a visual temperature read-out. It may also be desirable to include in the circuit 3 a calibrating resistor such as a variable resistor 20. The variable resistor 20 can be used to initially adjust the circuit to a predetermined current flow. Also a switch 22 is preferably included in the circuit for selective control.

The temperature reading portion 1 and the components of electrical circuit 3 can be enclosed in a single tube for convenience, e.g. a pencil-sized tube much like an ordinary thermometer.

It should be noted that the position of liquid 12 within the read-out portion 6 of the temperature indicating device is determined not by the temperature of the liquid but by the volume of the magnetostrictive material 10. There is no time delay necessary to heat, or cool, the liquid 12 to produce expansion or contraction of the liquid. On the contrary, the magnetostrictive material 10 responds immediately to variations in the field strength of the coil 14 and causes immediate displacement of the liquid in the lateral portion 6 to produce essentially an instantaneous reading of any unknown temperature.

The temperature reading portion of this device is not directly exposed to the temperature being measured. However, where excessively high or low temperatures are to be measured, it has been found desirable to use a liquid medium which has a low volumetric temperature coefficient of expansion, such as alcohol so as to minimize the effect of inherent expansion and contraction of the liquid 12 due to a change in its own temperature. It may also be desirable to construct the read-out portion 6 and the body 4 such that they will have a low ratio of cross sectional areas, so that the lateral portion 6 will have a sufficiently large cross sectional area to make any movement of the liquid due to a change in its temperature negligible as compared to movement of the liquid caused by the magnetostrictive action of the material 10. In this respect, a sintered magnetic material can be used which, being porous, will occupy a greater volume for a given amount of material and will have a more marked effect on the liquid 12. If desired, one or more transistors (not shown) may be included in the electrical circuit, preferably in series circuit relationship with the other components, to function as amplifiers and increase the sensitivity of the device and reduce the possibility of inherent error in the device due to the expansion or contraction of the liquid 12 as the result of a change in its own temperature.

Although this invention has been discussed as a temperature indicating device, it can be used to measure or indicate values other than temperature. For example, the coil 14 can be connected in a circuit of unknown current or voltage and the device, with the provision of suitable graduations on the read-out portion 6 and proper calibration, can be used to measure or indicate current and/or voltage. Therefore, the illustration and discussion of this invention in relation to a particular preferred embodiment thereof has been for illustrative purposes only and is not to be taken by way of limitation, and it is intended in the appended claims to cover all modifications and embodiments of this invention as fall within the true spirit and scope thereof.

What I claim is:

1. A temperature indicating device comprising, in electrical series circuit relationship, an electrical coil, a source of electrical current, a variable resistor adjustable to preset said circuit to a predetermined initial flow of current through said coil, and a thermistor adapted to be exposed to unknown temperatures so that the current supplied to said coil is controlled by said thermistor and corresponds to said unknown temperatures; a magnetostrictive material positioned in the field of said coil; a sealed enclosure for said magnetostrictive material including a first portion containing said magnetostrictive material and a second portion of reduced cross sectional area; and a liquid filling said first portion of said enclosure and extending into said second portion of said enclosure.

2. The combination of claim 1 wherein said liquid has a low volumetric temperature coefficient of expansion.

3. The combination of claim 1 wherein said first and second portions of said enclosures have a low ratio of cross sectional areas.

4. A temperature indicating device comprising, in combination, an electrical coil, a source of electrical current connected to and supplying said coil, a thermistor adapted to be exposed to an unknown temperature and being connected to said coil so that the current passing through said coil is controlled by said thermistor and corresponds to said unknown temperature, a magnetostrictive material positioned in the field of said coil, a sealed enclosure for said magnetostrictive material and including a portion having graduations thereon and a liquid contained within said enclosure in contact with said magnetostrictive material and extending into said graduated portion.

5. A temperature indicating device comprising, in combination, an electrical coil, a source of electrical energy connected to and supplying said coil, means in circuit with said coil and said electrical energy source and being responsive to temperature for varying the current supplied to said coil in accordance with temperature, a magnetostrictive material positioned in the field of said coil, a sealed enclosure for said magnetostrictive material and including a portion having graduations thereon, and a liquid contained within said enclosure in contact with said magnetostrictive material and extending into said graduated portion.

6. A temperature indicating device comprising, in combination, a magnetizable material, a sealed enclosure for said magnetizable material and including a portion having graduations thereon, a liquid medium contained within said enclosure in contact with said magnetizable material and extending into said graduated portion, means for magnetizing said magnetizable material, said liquid medium being moved relative to said graduations in accordance with variations in the physical characteristics of said magnetizable material due to magnetization thereof, and temperature responsive means exposed to an unknown temperature and connected to and controlling said magnetizing means in accordance with said unkown temperature.

7. An indicating device comprising, in combination, an electrical coil adapted to be connected in an electric circuit, a magnetostrictive material positioned in the field of said coil, a sealed enclosure for said magnetostrictive material including a portion having graduations thereon, and a liquid contained within said enclosure in contact with said magnetostrictive material and extending into said graduated portion.

References Cited in the file of this patent

UNITED STATES PATENTS

| | | |
|---|---|---|
| 2,623,206 | Hornfeck | Dec. 23, 1952 |
| 2,856,581 | Alldredge | Oct. 14, 1958 |
| 3,007,063 | Harris | Oct. 21, 1961 |

FOREIGN PATENTS

| | | |
|---|---|---|
| 66,187 | Germany | Dec. 29, 1947 |